Feb. 22, 1949.  A. V. BEDFORD  2,462,456
ANTIHUNT SERVOMOTOR CONTROL SYSTEM
Filed April 14, 1945  2 Sheets-Sheet 1
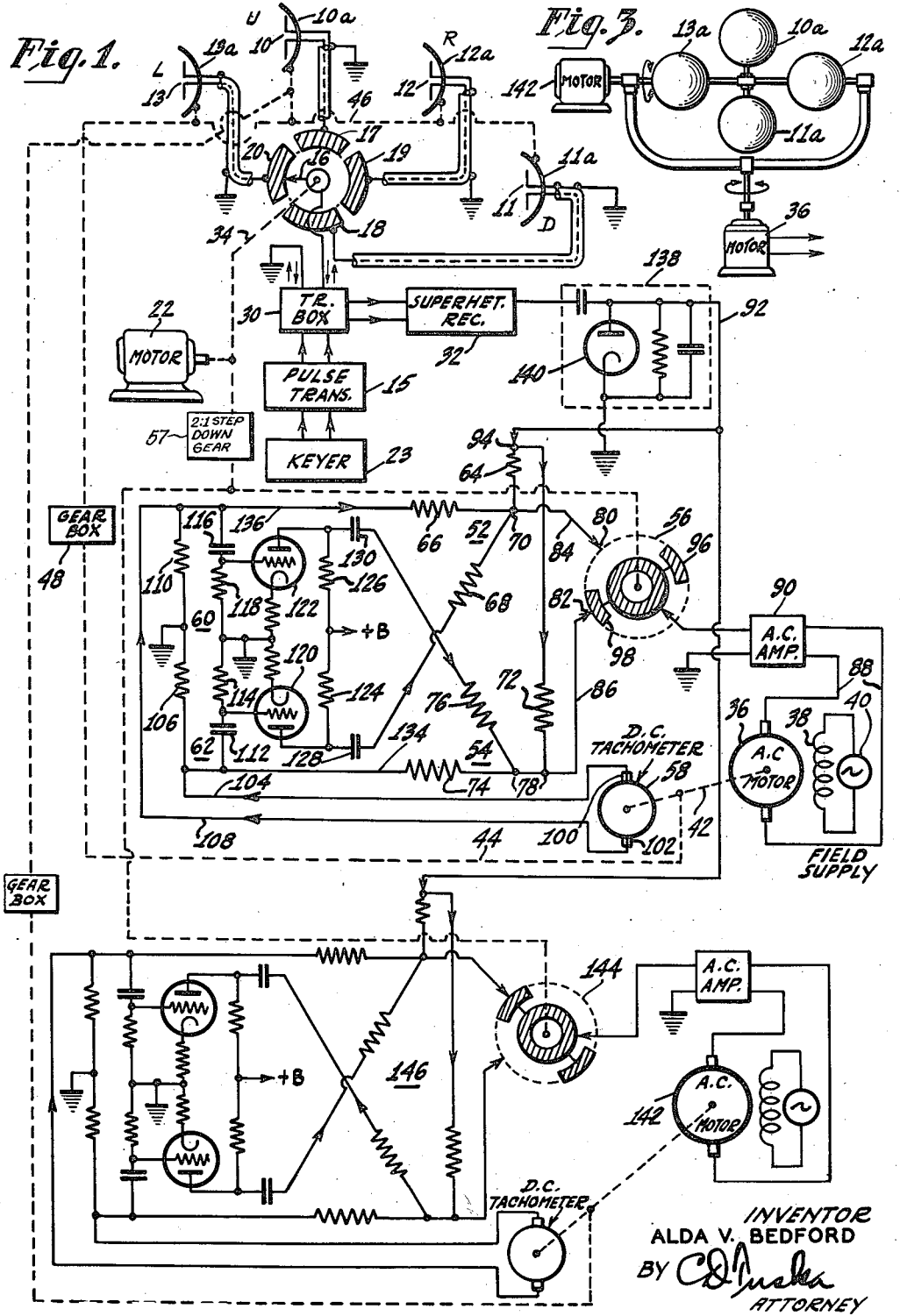
INVENTOR
ALDA V. BEDFORD
BY [signature]
ATTORNEY

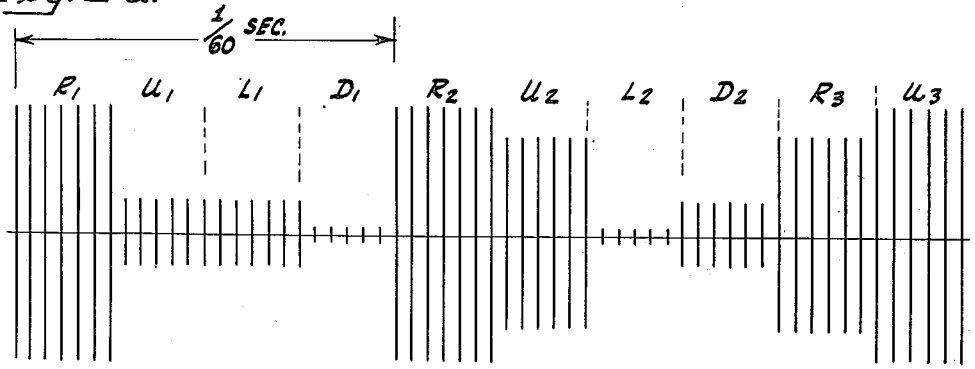
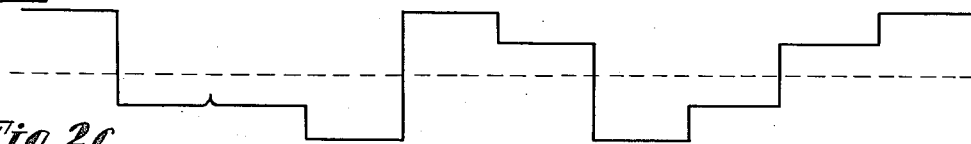
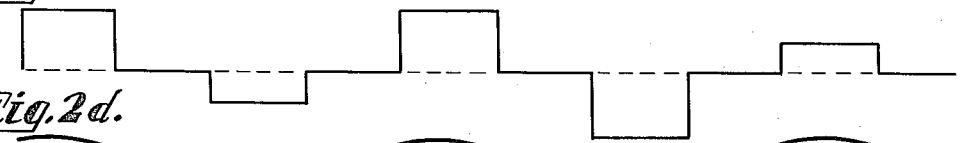
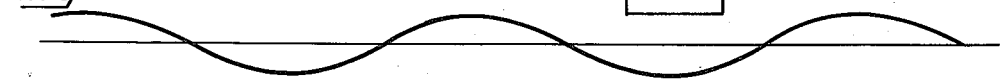
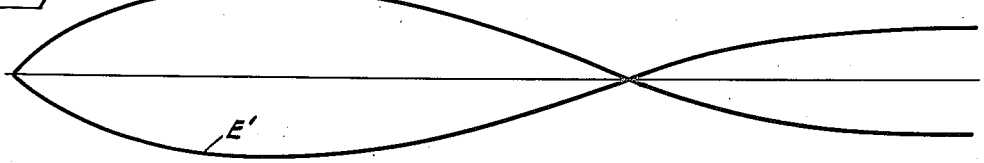
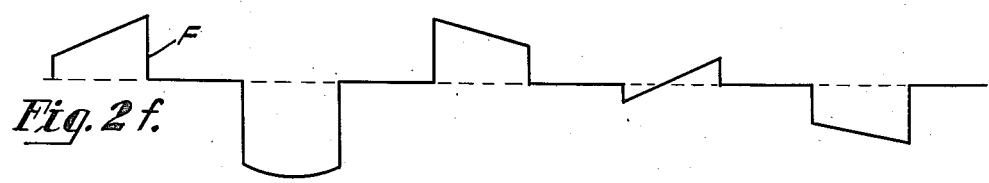
INVENTOR.
ALDA V. BEDFORD Patented Feb. 22, 1949

2,462,456

UNITED STATES PATENT OFFICE 2,462,456

ANTIHUNT SERVOMOTOR CONTROL SYSTEM

Alda V. Bedford, Princeton, N. J., assignor to Radio Corporation of America, a corporation of Delaware Application April 14, 1945, Serial No. 588,276

7 Claims. (Cl. 318—18)

This invention relates to a motor control system, and more particularly to a motor control sytem for use in an electrical servo system of the type in which alternating control signals are employed.

It is well known to those skilled in the art that servo systems tend to be inaccurate and sluggish if the displacement signal produces too little effect on the motor, and tend to overrun the correct position and "hunt" if the displacement signal is made sufficiently effective to overcome the effects of friction. It is common practice to combat these difficulties by adding to the displacement signal further signals which are in effect time derivatives of the displacement signal.

One of the objects of the invention is to provide an improved method of and means for reducing hunting in an electrical servo system and therefore for improving the stability of the system.

Another object is to control the operation of an A. C. motor by means which include comparatively simple and readily available components.

A third object is to provide an improved servo system adapted for automatically positioning directive radio antennas in response to radio signals picked up thereby.

According to the invention these objects are achieved by first obtaining equal in-phase components of the alternating control signals, commutating these components and driving an A. C. motor coupled to the output shaft in accordance with the commutated signal. There is then obtained from operation of the motor a direct current signal representative of the speed of the motor, and equal positive and negative components of this signal are differentiated. One of the components of the original displacement signal is then combined with one of the components of the direct current signal representative of the velocity of the displacement and with one of the differentiated components representative of acceleration. The other components of the same signal are combined in a parallel channel, and the signals thus combined are applied to the same commutator as previously. It is thus possible to drive an A. C. motor in an A. C. system in accordance with the velocity and acceleration of the displacement as well as the displacement itself, and to achieve a desirable reduction in hunting by means which are simple by comparison with those used in devices of the prior art for the same purpose.

The invention may be better understood from the following description of an embodiment thereof when read in conjunction with the accompanying drawing, in which:

Figure 1 is a circuit diagram of part of a radio locator system embodying the present invention, Figures 2a to 2f inclusive are curves of signals produced at various points in the system of Fig. 1, as more fully explained hereinafter, and Figure 3 shows the coupling from the antenna-positioning motors of Fig. 1 to the antenna system of that figure.

In Fig. 1 only those elements of a radio locator system necessary to an understanding of the present invention are shown. The system comprises four directive antennae 10, 11, 12 and 13 and provided with reflectors 10a, 11a, 12a and 13a respectively for radiating slightly upward, downward, to the right, and to the left, respectively, with respect to a central common axis, as indicated by the letters U, D, R and L. The antenna system, which is indicated only schematically in the drawing, may consist of four directive antennae which may be keyed successively as described, for example, in the co-pending application of Irving Wolff, Serial No. 259,057, filed February 28, 1939, now Patent 2,412,702, issued December 17, 1946, and entitled "Object detection and location"; or an antenna system may be employed which is keyed by means of low reactance capacitors, as described and claimed in the co-pending application of George H. Brown, Serial No. 412,943, filed September 30, 1941, now Patent 2,400,736, issued May 21, 1946, and entitled "Antenna systems." It will be understood that the radiation patterns for these antennae preferably are overlapping conical patterns and that the antenna radiation is greatest at the center and weakens toward the edges of the cones.

High frequency radio pulses are supplied successively to the antennae 12, 10, 13 and 11 from a transmitter 15 through a transmit-receive box 30, a rotating switch arm 16 and associated commutator segments 19, 17, 20 and 18 respectively, assuming counter-clockwise rotation. The switch arm 16 is rotated by a motor 22 which is mechanically coupled thereto as indicated by the broken line 34. The radio pulses may be obtained by modulating the high frequency carrier wave of the transmitter 15 by means of keying pulses from a multivibrator keyer 23 or the like supplying pulses having a recurring rate of about four kilocycles per second, for example.

The transmitted pulses are picked up, after reflection, by the directive antenna system 10, 11, 12 and 13 and supplied through the rotating switch arm 16 and the transmit-receive box 30 to a superheterodyne receiver, indicated in block at 32. Alternately, the reflected signals may be picked up by an antenna or antenna system separate from the radiating antennae 10, 11, 12 and 13.

Fig. 2a shows the envelope of the received radio-frequency signals. Each vertical line represents a received pulse. If the reflected pulses are from an object which is not symmetrically disposed with respect to the four radiation patterns, the reflected pulses from the respective patterns will have step-like variations in peak amplitude as the transmitter is connected in turn to the four antennae. Each sequence of four is repeated 60 times a second. The detector of the superheterodyne receiver produces a wave consisting simply of groups of pulses modulated in amplitude in accordance with the position of the reflecting object with respect to the antenna array. The receiver includes also a peak detector 138 constituted by a diode 140 and associated input and output circuit elements. The peak detector responds to the peak amplitudes of the pulse groups and produces the simple stepped or rectangular wave of Fig. 2b, having relative amplitudes corresponding to the values of the envelope levels $R_1$, $U_1$, $L_1$, $D_1$ or $R_2$, $U_2$, $L_2$, $D_2$, as the case may be, of Fig. 2a.

A motor 36, which may be any known type of reversible A. C. motor, is provided with a field winding 38 connected to any appropriate source 40 of alternating current, for example, the 60 cycle-per-second commercial supply. The motor moves the antenna system either to the right or to the left in response to the received signals, in order to center it on the target. In Fig. 1 the output shaft 42 of the motor 36 is shown mechanically coupled, as indicated by a broken line 44, to a frame or support indicated at 46 for the antenna system including the antennae 10, 11, 12 and 13. The coupling from the motor to the antennae may include speed-reducing gears as indicated by the gear box 48. Another and similar motor 142 may be provided for moving the antenna system in a vertical plane.

The coupling between the A. C. motors 36 and 142 and the antenna system is shown more clearly in Fig. 3, from which it may be seen that the motor 36 moves the antenna system slightly either to the right or left, while the motor 142 moves the system slightly upward or downward.

The control system for the motor 36 comprises a pair of combining networks 52 and 54 respectively, a commutator 56, a direct current tachometer 58, and a pair of differentiating networks 60 and 62, respectively. The combining network 52 consists of three resistors 64, 66 and 68 connected in star to a common junction point or output terminal 70. The output voltage of this network is proportional to the sum of the voltage applied to its component resistors. The combining network 54 consists similarly of three resistors 72, 74 and 76 connected in star to a common junction point 78.

Each resistor in one network has a corresponding resistor in the other network, the corresponding resistors of each pair being of equal value. Resistors 64 and 72 are connected together at a point 94 which is connected by a conductor 92 with the peak detector 138 from which the two resistors therefore receive identical signals.

In place of the resistors, other forms of impedance may be used for the combining networks.

The commutator 56 is provided with a pair of diametrically opposed commutator segments 96, 98 and has a pair of input terminals 80, 82 spaced 90° apart on the circumference of the commutator. The common junction points 70 and 78 of the combining networks are connected to the input terminals 80, 82, respectively, by conductors 84 and 86. The output of the commutator is applied to the motor 36 by a conductive channel 88, which may include an A. C. amplifier 90.

The commutator 56 is rotated by the motor 22 at one-half the speed of the switch arm 16 by means of a 2:1 stepdown gear 57. The rotation of the commutator 56 must also be synchronized with respect to the rotation of the switch arm 16, so that the commutator segments 96, 98 make contact with the input terminals 80, 82 when the switch arm 16 is effectively in contact with the segments 19 and 20 which are connected to the "right" and "left" antennae 12 and 13. The commutator 56 is open when the switch arm 16 engages segments 17 or 18.

In the system thus far described, the up-down, right-left signals appearing across the output terminal 94 of the peak detector 138 are equally divided by resistors 64 and 72 and applied to the commutator 56, which is arranged to select the right and left signals and reject the up and down signals.

Since the commutator selects only the right and left lobes of the wave shown in Fig. 2b, the output of the commutator takes the form represented in Fig. 2c.

The signals selected by the commutator are amplified if necessary by the amplifier 90 and control the speed and direction of rotation of the motor 36, which moves the support 46 by means of the mechanical coupling 44 and gears 48 to center the antenna system in a right or left sense on the object from which the radiated signals are reflected.

The motor has a field represented by the sine wave of Fig. 2d, this wave being in phase with the 60-cycle component of the curve of Fig. 2c so that torque is produced which tends to cause motor 36 to rotate in the direction necessary to rotate the antenna array toward the object. It will be understood that if the antenna array had been pointing to the other side of the object the amplitude of the left pulse group $L_1$ would have exceeded that of the right group $R_1$. This would reverse the phase of the energizing current (Fig. 2c) and would also reverse the direction of rotation of the motor 36. If the array was focussed exactly on the object, both pulse groups would be of equal amplitude and there would be effectively no energizing current supplied to the motor by amplifier 90.

To reduce hunting, the shaft 42 of the motor 36 is coupled to the direct current tachometer 58, which is provided with output terminals 100 and 102. Across these terminals there will appear a variable D. C. voltage related in magnitude and polarity to the speed and direction of rotation, respectively, of the shaft 42, this being in turn closely related to the first time derivative of the amplitude of the right-left signals selected by the commutator 56. The terminal 100 of the tachometer is connected to ground by a conductor 104 and resistor 106, and terminal 102 is similarly connected to ground by a conductor 108 and a resistor 110 of equal value to the resistor 106. The voltages appearing across the two last-mentioned resistors, are, therefore, equal positive and negative components of the direct current output of the tachometer. These voltages are applied by conductors 134 and 136, respectively, to corresponding resistors 74 and 66 of the combining networks 54 and 52.

The differentiating networks 60, 62 before referred to are connected between the conductors 134, 136 and consist of resistor-capacitor series combinations 116, 118 and 112, 114 respectively. The outputs of these combinations are voltage components corresponding to the time derivatives of the voltage appearing across the resistors 110 and 106 and are, therefore, representative of the acceleration of the motor 36, and hence of the acceleration of the amplitude of the displacement signals selected by the commutator 56. These outputs are amplified by tubes 122 and 120, respectively and applied through coupling capacitors 130, 128 to the third pair of corresponding resistors 76, 68 of the combining networks 54, 52.

Since the amplifiers reverse the polarity of the "second derivative" signals, the output of the amplifier 120 is applied to the combining network 52, while the output of the amplifier 122 is applied to the network 54.

By this means, the signals applied to each combining network are representative of the original displacement from center and of the first and second time derivatives of that displacement. The output of each combining network is proportional to the sum of the individual applied signals, and the output is applied to the terminals 80 and 82 of the commutator 56. The motor 36 is thus controlled in accordance with three component signals and locates the antenna system properly with a minimum of hunting.

Waves E and E' of Fig. 2e represent the variable D.-C. signals from the tachometer which are also applied to the commutator 56. The commutator passes the waves E and E' alternately, generating wave F which is in phase with the motor field and produces torque in a direction depending upon whether the L lobe or R lobe is higher in the wave of Fig. 2a. The D.-C. derivative signal is thus converted into an A.-C. signal suitable for driving the motor. The commutator serves the double purpose of selecting the desired parts of the wave of Fig. 2b and also converting the waves of Fig. 2e to A.-C.

As before mentioned, a similar motor 142 and control circuit 146 may be used to control the position of the antenna system in the up and down sense. The control circuit 146 which controls the A.-C. motor 142 is precisely the same as the circuit hereinbefore described for the control of the motor 36, the only difference being that the commutator 144 is arranged to select the up and down signals instead of the right and left ones.

There has thus been described a motor control system including a commutator for selecting either up and down or right and left A.-C. signals, an A.-C. motor for moving a pair of directive antennae of a radio locator system in either a horizontal or vertical plane in accordance with the selected signals, a direct-current tachometer connected to the motor to produce a D.-C. signal representative of the first time derivative of the antenna displacement, differentiating networks to produce second time derivatives of the antenna displacement, combining networks for combining components of the original signal and of its first and second time derivatives, and connections for directing the antenna patterns by directing the antenna system in accordance with the signals so combined. A feature of the system described is the use of direct current elements to drive an A.-C. motor in accordance with A.-C. directional signals.

It will be apparent that the invention may be applied to servo systems generally, and is not limited to the particular radio locator system in connection with which it has been described; in particular, the target being tracked by the radio locator system described is effectively a pilot, in the sense in which that term is used in the servo art, and the function of the system is to procure the load, constituted by the antennae, to follow the pilot.

I claim as my invention:

1. A servo motor system for following a pilot, comprising a load, a motor for driving said load, means associated with said load for generating a first A.-C. signal having alternate lobes, the relative amplitude of said lobes being a measure of the displacement of the load from said pilot, means responsive to operation of said motor under control of said signal for generating a first D.-C. signal proportional to a function of said displacement, commutating means synchronous with the alternation of said lobes for alternately reversing the polarity of said first D.-C. signal whereby to produce a second A.-C. signal, means for combining said first A.-C. signal and said second A.-C. signal, means for driving said motor under control of said combined A.-C. signal.

2. The invention of claim 1 characterized in that said function is a first time derivative of said displacement.

3. The invention of claim 1 characterized in that said function is a second time derivative of said displacement.

4. The invention of claim 1 characterized in that said function is the sum of the first and second time derivatives of said displacement.

5. A motor control system including a pair of parallel-connected signal-combining networks each comprising three resistors connected in star to a common output terminal, each resistor in one network having a corresponding resistor in the other network, terminals for connecting a pair of corresponding resistors of each network to a source of alternating control signals, a commutator having a pair of input terminals spaced 90° apart, connections from the common output terminal of each network to said commutator terminals respectively, an alternating current motor connected to be controlled by the output of said commutator, a direct current tachometer having a pair of output terminals and connected to be operated by said motor, connections from said tachometer terminals to another pair of corresponding resistors of each combining network, a pair of resistor-capacitor combinations connected to said tachometer terminals, respectively, and connections from said combinations to a third pair of corresponding resistors of said signal-combining networks.

6. A system according to claim 5 including amplifiers connected between each of said resistor-capacitor combinations, and each resistor of said third pair.

7. The combination of a source of alternating signals having regularly recurring step-like voltage levels, a commutator rotatable at a speed related to the rate of recurrence of said voltage levels and having input terminals thereon spaced 90° apart and an output circuit, two parallel circuits connected to said source for obtaining therefrom two equal, in-phase components of said signals, an alternating current motor and connections from the output circuit of said commutator to said motor, means for obtaining from rotation of said motor a direct current signal representative in magnitude and polarity of the speed and direction respectively of rotation of said motor, circuit connections for obtaining equal positive and negative components of said direct current signal, means for differentiating each of said last-mentioned components to produce differentiated signals, circuit connections for combining one each of the aforementioned components of said alternating signals and of said direct current signal and said differentiated signals, and for applying the combined signal thereby produced to one of the aforementioned input terminals of said commutator, and connections for combining the other of the aforementioned components of said alternating signals, of said direct current signal and of said differentiated signals, and for applying the combined signal thereby produced to the other of the aforementioned input terminals of said commutator.

ALDA V. BEDFORD.

REFERENCES CITED

The following references are of record in the file of this patent:

UNITED STATES PATENTS

| Number | Name | Date |
|---|---|---|
| 2,113,436 | Williams | Apr. 5, 1938 |
| 2,367,746 | Williams | Jan. 23, 1945 |

FOREIGN PATENTS

| Number | Country | Date |
|---|---|---|
| 489,271 | Great Britain | July 22, 1938 |